United States Patent [19]

Kofsky et al.

[11] Patent Number: 5,151,746
[45] Date of Patent: Sep. 29, 1992

[54] OPTICAL TRACKING OF CHARGED PARTICLE BEAMS

[75] Inventors: Irving L. Kofsky, Welleslly Hill; Christian A. Trowbridge, Burlington, both of Mass.

[73] Assignee: The United States of America as represented by the Secretary of the Navy, Washington, D.C.

[21] Appl. No.: 677,899

[22] Filed: Apr. 1, 1991

[51] Int. Cl.⁵ .............................................. G01J 1/20
[52] U.S. Cl. .................................... 356/1; 356/4; 250/208.2
[58] Field of Search ................. 356/1, 4; 250/208.2

[56] References Cited

U.S. PATENT DOCUMENTS

| | | | |
|---|---|---|---|
| 3,633,010 | 1/1972 | Svetlichny | 356/1 X |
| 4,081,214 | 3/1978 | Van Buskirt | 356/1 X |
| 4,622,458 | 11/1986 | Boeck et al. | 250/203 R |
| 4,957,369 | 9/1990 | Antonsson | 356/1 |
| 5,057,881 | 10/1991 | Beder et al. | 356/1 X |

Primary Examiner—Mark Hellner
Attorney, Agent, or Firm—Kenneth E. Walden; Jacob Shuster

[57] ABSTRACT

Radiated images of the propagation path of a charged particle beam simultaneously projected to spaced points on a platform, are recorded therat by path tracking video cameras. Data on the positional orientations of the path tracking cameras during reception of simultaneously projected images, measured by inertial sensors, is utilized to calculate the location and direction of the beam propagation path by iterative triangulation.

13 Claims, 1 Drawing Sheet

OPTICAL TRACKING OF CHARGED PARTICLE BEAMS

BACKGROUND OF THE INVENTION

This invention relates to a method of locating in the atmosphere tracks of radiation in the visible, ultraviolet and infrared wavelength band forming unpredictable trajectories or the like, such as those produced by charged particle beams.

The concept of geometrically determining the location of a beam path in the atmosphere from data obtained by a detector on a monitoring platform is already known in the art, as disclosed for example in U.S. Pat. No. 4,867,556 to Bjorkman. The prior art also embodies various electronic sensing arrangements and data processing techniques for geometrical determination of locations or positions in general. For example, U.S. Pat. No. 4,822,163 to Schmidt teaches use of triangulation to provide guidance through 3D image data obtained from a TV camera type of sensor for robotic guidance of a tool. The use of cameras to record image scenes of fiber targets, or for moving body guidance, or to detect certain image features are disclosed in U.S Pat. Nos. 4,425,042 4,602,336 and 3,778,166 to Smith, Brown and Peare et al., respectively. The electronic determination of position relative to reference points spaced along a baseline for navigation of ships or aircraft is taught in U.S. Pat. Nos. 4,231,093 and 4,234,924 to La Vance et al.

However, the foregoing prior art sensor arrangements or data processing techniques are neither intended for nor capable of determining the geometrical location and direction of trajectories, produced by atmospheric phenomenon such as charged particle beams, from data collected on a moving platform such as a marine vessel.

Accordingly, it is an important object of the present invention to determine the location and direction of trajectories having unpredictable paths in the atmosphere, involving the processing of data recorded by video type electronic cameras or detector arrays undergoing the same computer controlling tracking operations.

SUMMARY OF THE INVENTION

In accordance with the present invention a pair of angularly displaceable video-type cameras or the like mounted in fixedly spaced relation on a platform to track the path of a charged particle beam, have inertial sensors associated therewith to measure positional orientations of the respective cameras during path tracking operation under computer controlled manipulation. Optical recording of simultaneous image projections of the beam path by the cameras controls programming of the computer to process data from which location and direction of the beam path is calculated. Such calculations involve iterative triangulation with respect to planes extending from a baseline on the platform along which the tracking cameras are spaced from each other. Inertial sensors associated with the cameras provide 3D vector readout data based on the angular orientation of the triangulation planes and positional orientation of the cameras at points defining such planes from which the calculations are performed.

According to certain embodiments of the invention, the baseline platform is a marine vessel on which the path tracking cameras are mounted adjacent opposite ends thereof, and on which a beam generating gun is also mounted. Positional tracking controls for the cameras and corrective directional guidance controls for the beam generating gun, as generally known in the art, are utilized together with associated computer hardware. The details of such hardware and associated software source codes per se form no part of the present invention.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF THE PREFERRED EMBODIMENT

Figure 1:
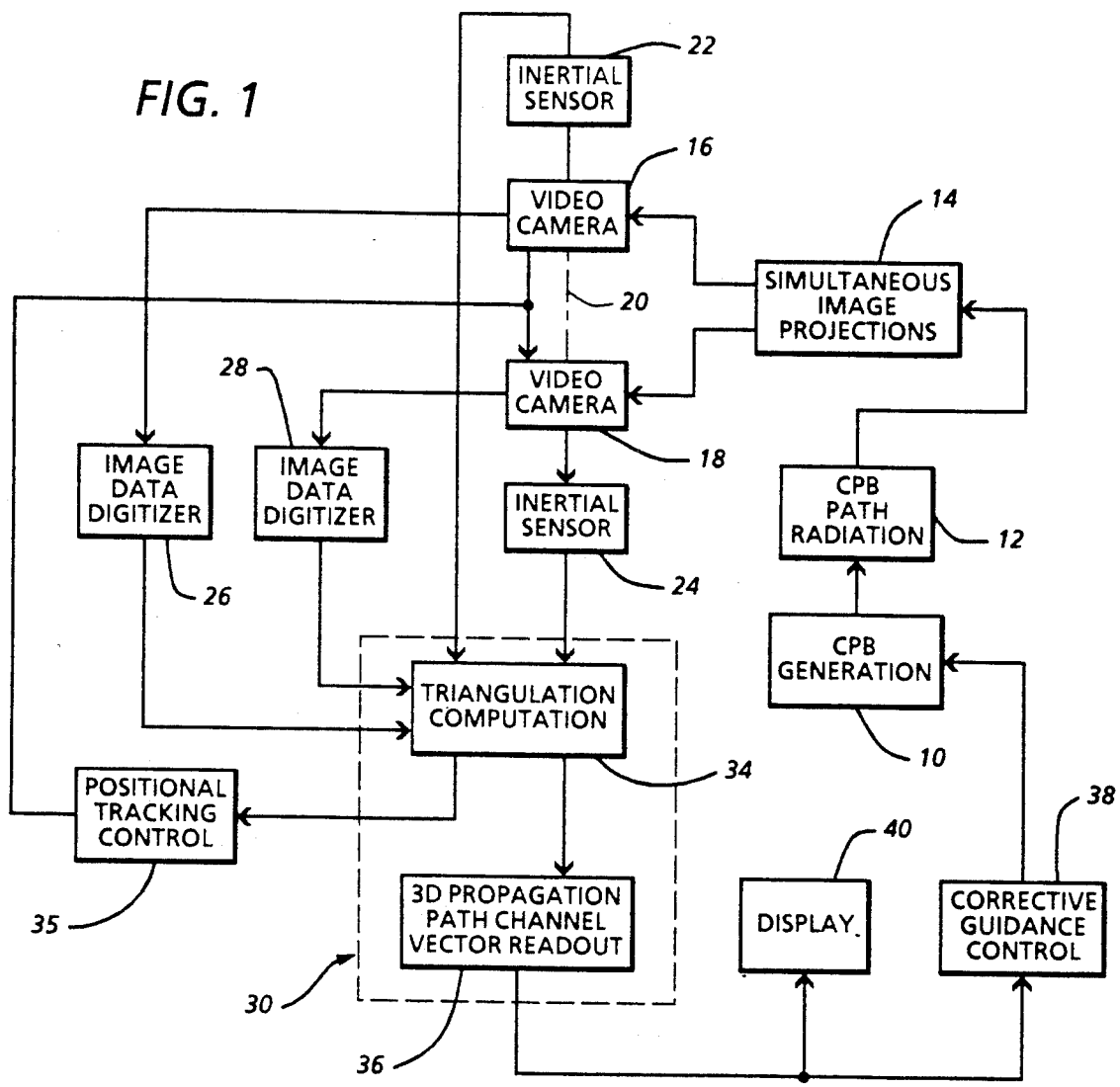
FIG. 1 is a block diagram illustrating the method of the present invention.

Referring now to the drawing in detail, the diagram block 10 in FIG. 1 denotes generation of a high-current relativistic charged particle beam (CPB). As a result of such beam generation, the beam (CPB) is propagated into the atmosphere along a path that is made self-luminous in response to beam triggered radiation as denoted by diagram block 12. The precise geometry of the beam propagation path originating from the location of beam generation will vary in dependence on local atmospheric, geomagnetic and other geophysical conditions for any directional orientation of the beam generator.

In accordance with the present invention, images formed by beam triggered radiation at various point locations along the propagation path or trajectory of the beam are projected simultaneously, as indicated by diagram block 14 in FIG. 1, to a pair of path tracking video-type cameras 16 and 18 on a baseline 20 schematically depicted in FIG. 1. The self-luminous nature of the beam propagation path producing the images arises because of CPB excitation of adjacent ambient air molecules according to one embodiment of the invention. Isotropically-emitted secondary fluorescence is thereby generated within a path channel of one inch diameter, for example, such emissions occurring at several relatively short wavelengths. The most favorable of such wavelengths for detection purposes under prevailing atmospheric conditions are currently perceived to the blue $N_2$+First Negative bands substantially between 3914 Å and 4278 Å, as well as UV·$N_2$ Second Positive bands extending substantially between 3371 Å and 3805 Å.

The two video-type cameras 16 and 18 are positioned in spaced relation to each other along a platform mounting establishing the baseline 20, such as a marine vessel, aircraft or land installation. Data on the relative translational positions and angular orientations of the two cameras 16 and 18 while tracking the propagation path are respectively generated by inertial sensors 22 and 24 to which the cameras are operatively connected. The cameras utilize two-dimensional focal plane array detectors, such as CCD or CID types or infrared sensitive arrays, to accommodate computer manipulation of image scenes formed by individual picture elements. The simultaneous projections 14 of the image scenes are thus recorded and stored in the respective cameras 16 and 18 as photogrammetry data.

The photogrammetry data stored in the cameras 16 and 18 is digitized as skeletonized binary representations of the beam propagation path with extraneous background removed by means of data processing digitizers 26 and 28 respectively associated with the cameras as diagrammed in FIG. 1. The binary information so obtained is transmitted from the data processing digitizers 26 and 28 to a central computer generally referred to by reference numeral 30, to which positional input data is also fed from the inertial sensors 22 and 24 as diagrammed in FIG. 1.

Figure 2:
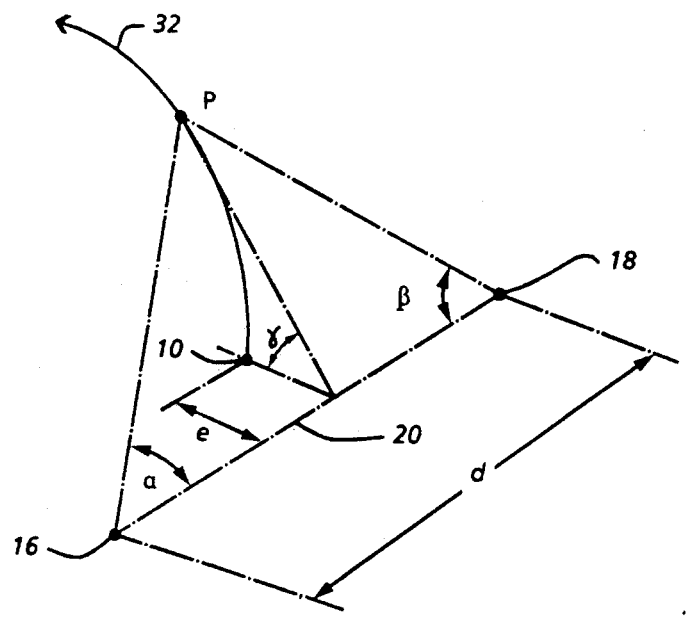
FIG. 2 is a geometrical diagram illustrating the basic spatial relationships involved in the method of the present invention.

As shown in FIG. 2, the two cameras 16 and 18 are denoted as tracking reference points spaced apart by a distance (d) on the baseline 20 of the platform mounting. The angular orientations $\alpha$, $\beta$ and $\gamma$ of the cameras instantaneously aligned with a point P on the beam propagation path 32 in a common triangulation plane during tracking operation, is obtained from the output data of the inertial sensors. The distances P-16 and P-18 in the triangulation plane are calculated by iterative triangulation from such output data and the values of (d) and (e) to geometrically determine the path trajectory 32 as denoted in FIG. 2

Accordingly, the data outputs of the inertial sensors involving the aforementioned parameters d, e, $\alpha$, $\beta$ and $\gamma$ depicted in FIG. 2, will enable computation of the location and direction of the beam propagation path channel in space by the central computer 30 involving iterative triangulation as referred to by diagram block 34 in FIG. 1. Such iterative triangulation type of computation during reception of binary data inputs from the digitizers 26 and 28 is performed in accordance with a suitable prior art program such as an algorithm previously developed for determining the geometry and transport of artificial upper atmospheric clouds. The output of the computational step denoted by diagram block 34 will therefore be in terms of dimensional vectors from which locational and directional data readout on the beam propagation path 32 is obtained as denoted by block 36 in the diagrammed computer 30. The triangulation computation output will also affect tracking manipulation of the cameras through control 35.

The readout from the computer 30, as diagrammed in FIG. 1, may be transmitted to a guidance control system 38 through which corrective change in directional orientation of beam generation 10 may be effected so as to cause the beam to intersect a predetermined target, for example. The data readout on the path location and direction may also be presented on a path tracking display 40 as shown.

Numerous other modifications and variations of the present invention are possible in light of the foregoing teachings. It is therefore to be understood that within the scope of the appended claims the invention may be practiced otherwise than as specifically described.

What is claimed is:

1. In a method of optically determining the geometry of a beam propagated along a path remotely spaced from a monitoring platform, the steps of: recording images separately formed by said beam along said path and simultaneously projected to spaced points on the monitoring platform during beam tracking operation; measuring positional orientations of the recorded images at said spaced points relative to the platform; and calculating location and direction of the path in space from the measured orientations during the tracking operation.

2. In a method of optically tracking a charged particle beam causing excitation of ambient air along a path from which radiation is optically detectable by cameras positioned on a monitoring platform, the steps of:
projecting images simultaneously generated from the radiation along said path to at least two of the cameras during tracking operation;
measuring positional orientations of the cameras relative to the platform in response to reception of the simultaneously projected images;
and calculating location and direction of the path in space from the measured orientations of the cameras during the tracking operation.

3. The method of claim 2 including the step of:
digitizing image data recorded by the cameras during said tracking operation.

4. The method of claim 3 wherein said measured orientations include angular tracking positions of the cameras on the platform relative to different triangulation planes and angular orientation of said planes.

5. The method of claim 4 wherein said step of calculating includes iterative computations with respect to the different triangulation planes.

6. The method of claim 1 including the step of:
digitizing image data recorded by the cameras during said tracking operation.

7. The method of claim 1 wherein said measured orientations include angular tracking positions of the cameras on the platform relative to different triangulation planes and angular orientation of said planes.

8. The method of claim 1 wherein said step of calculating includes iterative computations with respect to different triangulation planes.

9. The method of claim 2 wherein said measured orientations include angular positions of the cameras on the platform relative to different triangulation planes and angular orientation of said triangulation planes relative to the platform.

10. In combination with means for performing computational triangulation with respect to a platform baseline, during optical tracking of a beam propagation path remote from said baseline, including the steps of:
optically recording images of said path at spaced locations thereon projected to spaced points on the baseline;
determining positional orientations of simultaneous projections of said recorded images at said spaced points on the baseline;
and calculating location and direction of the path by triangulation from the determined positional orientations of the simultaneous image projections of the spaced locations on said path optically recorded at the spaced points on the baseline.

11. The system as defined in claim 10 wherein said positional orientations include angular orientations of the simultaneous image projections in triangulation planes extending from the baseline to the spaced locations on the path;
and angular orientation of said planes.

12. In a method of tracking trajectories in the atmosphere formed by path defining radiation, the steps of: recording images simultaneously formed by said radiation at spaced locations along the trajectories at spaced points along a platform baseline; determining positional orientations of said recorded images; and calculating geometry of the trajectories in the atmosphere by triangulation from the determined positional orientations of the recorded images simultaneously projected from said spaced locations.

13. The method of claim 12 wherein said radiation results from excitation by charged particle beams propagated through the atmosphere to produce said trajectories.

* * * * *